Aug. 10, 1965    E. T. ABLE    3,199,344
TORQUE TESTER
Filed Aug. 21, 1962    2 Sheets-Sheet 1
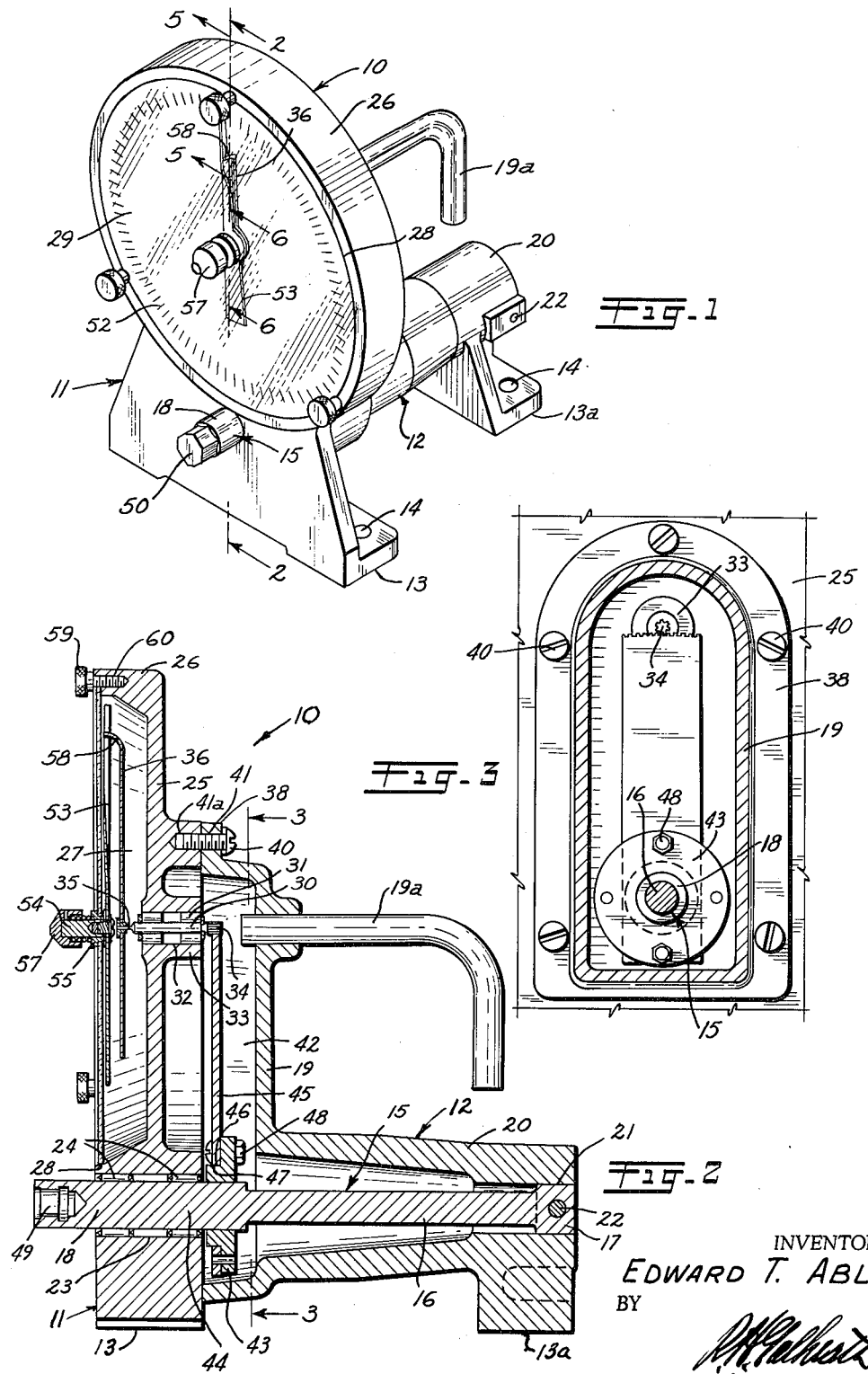
INVENTOR.
EDWARD T. ABLE
BY
*ATTORNEY*

Aug. 10, 1965  E. T. ABLE  3,199,344
TORQUE TESTER
Filed Aug. 21, 1962  2 Sheets-Sheet 2
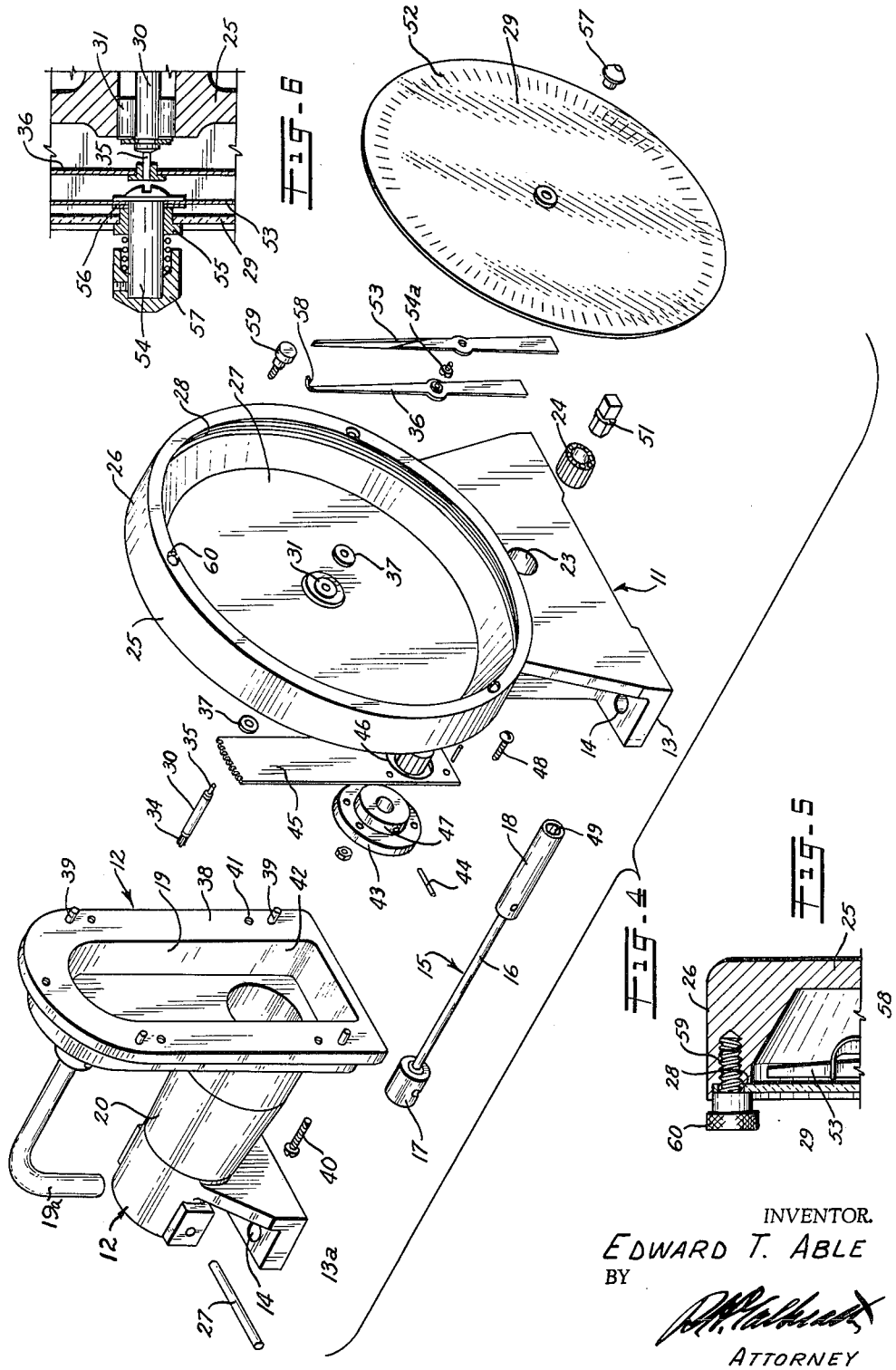
INVENTOR.
EDWARD T. ABLE
BY
ATTORNEY 3,199,344
TORQUE TESTER
Edward T. Able, Denver, Colo., assignor, by mesne assignments, to B. K. Sweeney Co., Denver, Colo., a corporation of Colorado
Filed Aug. 21, 1962, Ser. No. 218,294
2 Claims. (Cl. 73—134)

This invention relates to testing equipment and, more particularly, to torque testers. A primary object of the invention is to provide a novel and improved torque-testing device which may be used to check out and calibrate the resistance of torque-type handles for screw-drivers, wrenches and other tools using such handles.

Another object of the invention is to provide a novel and improved torque-testing apparatus which combines a rugged frame construction, and a comparatively heavy torsion bar with sensitive deflection-indicating mechanisms in a manner which produces a rugged but reliable and precise torsion calibrating instrument.

Another object of the invention is to provide, in a torsion-testing device, an improved construction of a torsion deflector rod having a twisting reach and a supporting reach mounted in an improved frame construction which is particularly adapted to carry the supporting reach of the deflector rod in a manner which permits free axial bending moments to be transmitted to the deflector reach of the rod and at the same time prevents the twisting reach of the rod from being laterally distorted by transverse bending moments as where a combined axial and torsion load is applied to the head of the instrument.

Another object of the invention is to provide in a novel and improved torsion testing instrument a simplified arrangement of movement-magnification means adapted to transmit minute twist deflections of a rugged torsion rod to a large, easily-readable scale with a minimum of error-producing slack and friction effects.

A further object of the invention is to provide a novel and improved torque testing device, wherein the movement magnification mechanisms are combined with a novel and simply-constructed gauge setting and zeroing-in means, associated with a simple construction of a dial face.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is an isometric view of a preferred embodiment of the torque tester;

FIG. 2 is a longitudinal sectional elevation of the tester as taken from the indicated line 2—2, FIG. 1;

FIG. 3 is a fragmentary, sectional portion looking from the rear of the unit, as taken from the indicated line 3—3, FIG. 2;

FIG. 4 is an isometric, exploded view of the apparatus showing the various components therefor;

FIG. 5 is a fragmentary, sectional detail as taken from the indicated line 5—5, FIG. 1, and being an enlarged fragment of the showing at FIG. 2; and FIG. 6 is a fragmentary sectional detail as taken from the indicated line 6—6, FIG. 1, and being an enlarged fragment of the showing at FIG. 2.

The use of torque-type handles for screw drivers, wrenches and like tools is becoming more and more common, for many artisans and mechanics throughout the country are discovering the advantages of setting-up screws and bolts to a predetermined tightness with torque-type handles. There also has been a growing need for apparatus to calibrate and test these different types of torque handles from time to time. Practically all torque indicating devices are operated by the deflection of a steel bar since the deflection of a good-quality steel within its proportional limit is substantially a perfect linear function and all that remains in a torque testing device is to properly calibrate the device and check this calibration from time to time, as for different uses and to make sure that the torque handle calibration is not changed by wear or abuse.

It follows that there is a need and a demand for an improved simple, reliable, low-cost, torque-testing device.

The present invention was conceived and developed to meet this need and it comprises in essence, a torque testing and calibrating apparatus which consists of a torsion bar carried securely in a heavy, rugged frame with the torsion bar being uniquely divided into a supported component and a twisting component, with the supporting component being carried in the frame in a manner which effectively eliminates bending moment effects which are transverse to the axis of the torsion bar. The unit also contains in combination with this improved torsion bar arrangement, a simplified means for transferring and indicating the comparatively minute twist deflections of the torsion bar to a rotating pointer arm. The combination further includes an improved arrangement of the shiftable, lockable dial gauge which permits a quick, simple zero-setting, either for clockwise or counter-clockwise torque measurements in a simple, fool-proof manner.

Referring more particularly to the drawing, the improved torque testing apparatus is incased in a suitable rugged framework 10 consisting of a front housing portion 11 and a rear housing portion 12 which will, hereinafter, be described in detail. To support the unit, each housing portion is formed with a suitable flanged base 13 and 13a, respectively. Mounting holes 14 are located in the foot portion of each base so that the apparatus may be secured to a bench if desired.

A cylindrical torsion bar 15 extends longitudinally through the lower portion of this framework through suitable passageways therein. This torsion bar includes a cylindrical twisting reach 16 which is at the rearward end of the apparatus. A short, enlarged connective head 17 is located at the rear end of this twisting reach. An elongated, enlarged, cylindrical supporting reach 18 is located at the front portion of the torsion bar 15.

The rear housing 12 includes as an upright, boxlike, mechanism-containing case 19 which is adapted to be affixed to the back side of the front housing portion 11, as hereinafter described. A suitable handle 19a may be affixed to this case 19 to facilitate carrying the apparatus.

A rearwardly-extending, tubular shell portion 20 is located near the base of the housing which contains the rearwardly-extending twisting reach 16 of the torsion bar 15, with the interior of the shell portion converging to a restricted cylindrical passageway 21 at its rearmost end to hold the connective head 17 at the rear end of the shell. The connective head 17 of the torsion bar is held against rotation by a shear pin 22, which is driven through a suitable transverse pin hole extending through the walls of the shell 20 and through the connective head 17.

The base portion of the front housing 11 of the framework is a comparatively heavy structure to provide for a wide cylindrical passageway 23 through which the supporting reach 18 of the torsion bar extends. A race of low-friction pin bearings 24 is positioned at each end of the cylindrical passageway 23 to support the reach 18 at two spaced points. This construction, using two bearings, permits low frictional resistance to rotation of the bar 15 but at the same time substantially eliminates transverse bending moments on the torsion bar which might otherwise exist when longitudinal axial bending moments are applied to the twisting reach of the bar as by a torque handle being connected with the front end of the torsion bar 15.

The upper portion 25 of the front housing 11 is generally disc-shaped with a forwardly outstanding peripheral rim 26 forming a dish-shaped cavity 27 wherein dial arms, hereinafter described, are housed. The outstanding edge of the rim 26 is internally rabbetted to form a ledge 28 which supports a transparent dial face 29, hereinafter further described.

A dial shaft 30 is mounted in suitable low-friction bearings 31 which, in turn, are mounted in an axially centered passageway 32 in the upper portion 25. This passageway is formed in a boss 33, a part of the upper portion 25. The rearward end of the shaft 30 outstands from this boss as a pinion 34. The forward end of the shaft 30 outstanding from the face of the upper portion 25 has a reduced-diameter tapered shaft 35 adapted to hold a dial arm 36 by a frictional fit in a conventional manner. Suitable washer means 37, illustrated at FIG. 4, are mounted upon this shaft 30 at each side of the upper portion 25 to reduce friction and hold the shaft in place in a conventional arrangement.

The case 19 of the rear housing is formed generally as a flanged, box-like member which abuts against the back face of the front housing 11, with the flanges 38 of the case including mounting pins 39, FIG. 4, which fit into sockets at the back wall of the front housing, not shown. When the housing portions 11 and 12 are properly fitted together, the housing portions may be interlocked by suitable machine screws 40 extending through holes 41 in the flanges 38 and into registering, threaded sockets 41a in the back wall of the front housing 12.

An upwardly extending chamber 42 is formed in the case 19 to accommodate interconnecting mechanisms between the torsion bar 15 and the pinion 34. A circular, stepped flange 43 is mounted upon the rear end of the supporting reach 18 of the torsion bar, and is affixed thereon by a shear pin 44. A generally rectangular, gear segment 45 is mounted upon the flange 43. This mounting is effected by an axially centered orifice 46 in the gear segment which is fitted upon a stepped shoulder 47 of the flange 43 and held thereto by suitable bolts 48 extending through orifices in the gear segments and flange, as illustrated at FIG. 2. It follows that minute rotation of the torsion bar will deflect the gear segment 45 sufficiently to rotate the pinion 34 of the dial shaft 30.

Connection of the torsion rod with a torque wrench handle, or the like, for twisting the same, is effected by a suitable socket 49 at the front end of the torsion rod, this front end extending a short distance beyond the face of the instrument. In preferred constructions, the socket 49 is of a hexagonal form of a selected size, but any suitable adapter may be mounted in this socket to fit practically any type of wrench or handle which is to be tested. For example, a male-female type adapter 50, such as illustrated at FIG. 1, or a hexagonal-to-square type adapter 51, such as illustrated at FIG. 4, may be used.

The torsion deflection of the twisting reach 16, within the proportional limits of the material is, for all practical purposes proportional to the torque applied to the reach and a deflection scale 52 may be printed about the periphery of the dial face 29 which will reliably indicate the torque applied to the bar 15. The scale may be in any convenient unit, such as inch-ounces, inch-pounds, or gram-centimeters, as desired, with the calibration depending upon the length of the twisting reach 16, the diameter of this reach, and the gear ratio between the pinion 34 and the gear segment 45.

It is especially desirable to measure a maximum applied torque and to often measure a maximum applied torque for only a fraction of a second. To facilitate measurements of this nature, an indicating hand 53 is frictionally and rotatably mounted on a pivot element 54 by a friction nut 54a. The pivot element 54, in turn, is frictionally mounted in an axially centered bearing 55 on the dial face 29. The pivot element 54 extends through this bearing with suitable lock washers 56 at each side of the bearing 55 to hold the boss in place with the outward portion carrying a thumb knob 57.

The material selected for the hand 53, the pivot element 54 and the bearing 55 and the fitting-up of these elements are such that the pivot element and its indicating hand thereon may rotate in the bearing 55 with a small frictional drag so that once the boss and the hand 53 are revolved to a selected position, they will not change their position until again moved. Likewise, the hand 53 may rotate on the boss 54 with a small frictional drag so that once it is revolved to a selected position with respect to the pivot element, it will not change its position until again moved. The outstanding end of the dial arm 36 is turned forwardly, as shown at 58, to contact with the indicating hand 53, as in the manner clearly illustrated at FIG. 5.

It follows that advancing movement of the arm 36, as by a torque twist operation, will carry the indicating hand 53 with it. However, when the dial arm 36 returns upon release of the torque pressure, the indicating hand will remain in its final position. It is to be noted that by properly swinging the indicating hand to either side of the dial arm, torque measurements can be in a clockwise or counter-clockwise direction.

In any mechanism involving gear-pinion type of movement, lost motion or slack is inevitable. In effecting minute torque deflections with the apparatus above described, this slack is very significant and it is desirable to take up all slack and to set the deflection scale 52 in a position where zero torque is truly indicated by the dial arm and the indicating arm. This is effected in the present invention by an improved and simplified means involving the rotation of the dial face 29 by the knob 57 to zero in the deflection scale 52 at the same time the indicating arm 53 is set to eliminate slack. The dial face, as hereinbefore stated is carried in the ledge 28 of the upper portion 25 and with a comparatively loose, slidable fit. It is locked in position by a triad of shouldered thumb screws 59 which are turned into threaded sockets 60 in the peripheral rim 26. The under-shoulder portion of each thumb screw bears against the edge of the dial face 29 to lock it in position in the ledge 28 when the thumb screws are turned in the sockets. When these screws 59 are loosened, the entire dial face may rotate by turning the knob 57. The dial face and the indicating hand 53 may be rotated in a direction reverse to the rotation during testing to first press the indicating hand 53 against the dial arm extension 58. This takes up all slack in the gear mechanism. Then, with continued rotation, with the indicating hand slipping on the pivot element 54 and remaining against the dial arm, the dial face may turn until the zero mark of the scale 52 registers with the dial arm and indicating hand. The apparatus is then ready for use.

While a specific form of the improvement has been described and illustrated herein, it is to be understood that the same may be varied, within the scope of the appended claims, without departing from the spirit of the invention.

Having thus described the invention what is claimed and desired to be secured by Letters Patent is:

1. A torque measuring apparatus adapted to measure a minute rotative deflection of a torsion bar, magnify the deflection, and indicate the magnified deflection on a calibrated dial gauge comprising: a movement indicating means including a gear sector mounted upon the torsion bar and extending substantially to the axis of the dial gauge; a dial shaft at the axis of the gauge having a pinion at one end engaging with the gear sector and with the other end at the face of the gauge; a dial arm affixed to this other end adapted to swing about the gauge; a rotatable transparent face over the gauge having a deflection scale marked thereon; an indicating hand rotatably mounted on said transparent face at the axis of the gauge; friction means resisting rotation of said indicating hand, said indicating hand being positioned in the advancing path of said dial arm to be rotated by the latter and to remain at the maximum rotated position after the dial arm returns to its initial position upon release of a torque load; a turning knob extending through the dial face and carrying the said indicating hand with the turning knob being mounted in the dial face with a light frictional drag, and with the said indicating hand mounted on the knob with a light frictional drag; and releasable means holding the dial face on the dial gauge whereby, when the releasable means are released, rotation of the knob permits rotation of both the face and the said indicating hand to permit zeroing-in adjustments of the apparatus to take up slack and lost motion in the apparatus.

2. A dial combination for torque testers of the type having a rotating torsion-indicating arm comprising: a fixed dial gauge rim concentrically surrounding the axis of said arm; a circular, transparent dial face inset in and rotatable in said rim forwardly of said indicating arm; torque calibrations carried by said dial face forwardly of the path of said arm; an axially centered bearing in said dial face; a pivot element rotatably mounted in said bearing and extending through said dial face; a finger knob on the external extremity of said pivot element; an indicating hand frictionally mounted on the internal extremity of said pivot element and extending radially into the advancing path of said torsion-indicating arm; a first friction means frictionally engaging said hand to said pivot element; a second friction means frictionally engaging said bearing to said dial face so that the latter may be rotated by the former; and manually releasable means securing said dial face to said gauge rim at any desired circumferential position.

References Cited by the Examiner

UNITED STATES PATENTS

| | | | |
|---|---|---|---|
| 388,404 | 8/88 | Fischer | 58—85.5 |
| 1,018,582 | 2/12 | Nelson | 73—396 |
| 2,848,973 | 8/58 | Stiens | 73—396 X |
| 2,885,884 | 5/59 | Nelson | 73—139 X |
| 3,012,431 | 12/61 | Schmidt | 73—1 |
| 3,069,903 | 12/62 | Larson | 73—139 |
| 3,079,785 | 3/63 | Livermont | 73—1 |
| 3,153,930 | 10/64 | Jackson | 73—134 |

RICHARD C. QUEISSER, *Primary Examiner.*